United States Patent Office.

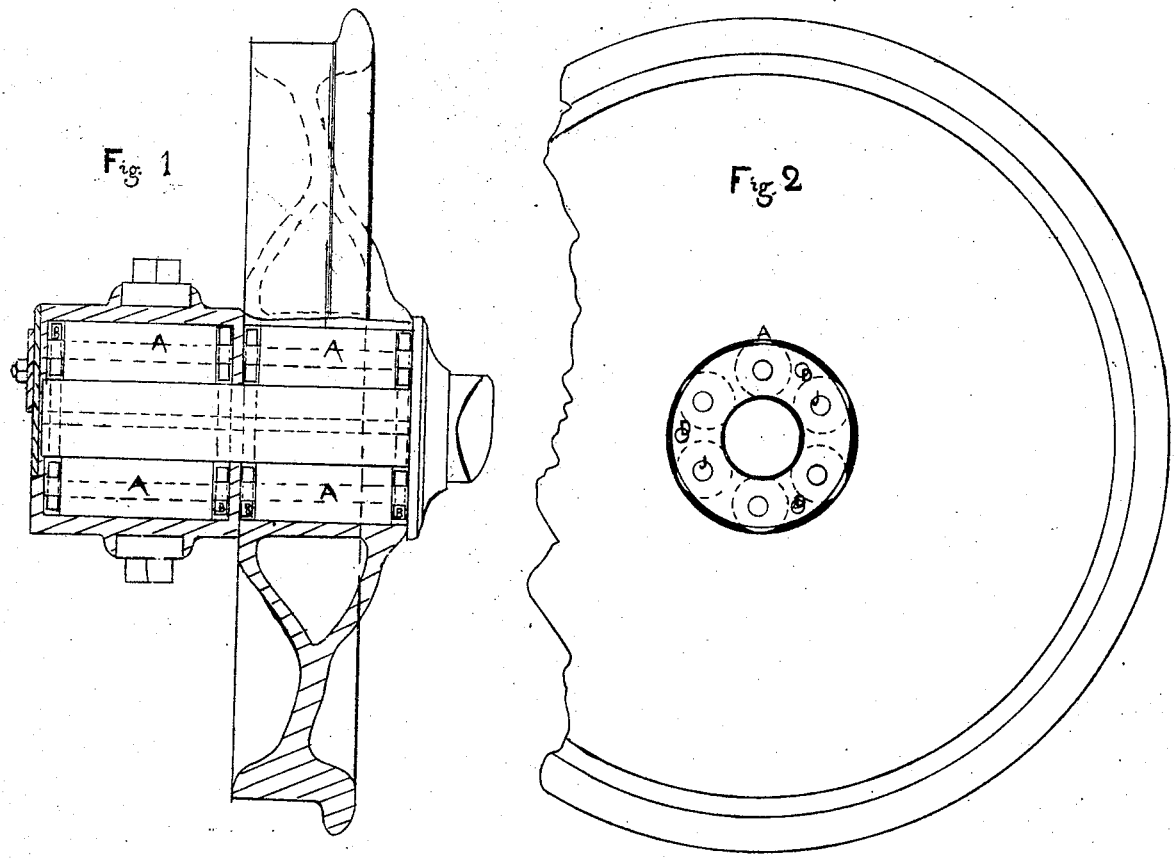

CHARLES H. PARSHALL, OF DETROIT, MICHIGAN.

Letters Patent No. 71,527, dated November 26, 1867.

---

IMPROVEMENT IN ANTI-FRICTION JOURNALS FOR CAR-WHEELS, &c.

---

The Schedule referred to in these Letters Patent and making part of the same.

---

TO ALL WHOM IT MAY CONCERN:

Be it known that I, CHARLES H. PARSHALL, of Detroit, in the county of Wayne, and State of Michigan, have invented a new and useful Improvement in Bearings for Railroad-Car Journals and Wheels; and I do hereby declare that the following is a full, clear, and exact description of the same, reference being had to the annexed drawings, in which—

Figure 1 is a longitudinal section, and

Figure 2 is a side elevation.

The same letters in both figures indicate parts which are identical.

My invention consists in the use of anti-friction bearings for supporting the journals of railway-car axles, and also in attaching one fast and one loose wheel, the latter also turning upon a similar bearing.

The following description will enable persons skilled in the art to apply my improvement:

A series of cylindrical metallic rollers, A, is constructed with journals C, projecting from the centre of each end, by which the rollers are attached to two steel rings, B B, the journals passing through round holes J, bored equidistant from one another through the rings, and permitting the rollers to turn freely on their axes. The rings are then united by a series of rods, D, passing through both rings. The rings are narrower than the diameter of the rollers, so that the rollers shall project beyond both the outside and inside edges of the rings, thus forming a bearing, either for a journal passing through the centre, or for the hub of a wheel within which the anti-friction bearing is placed.

Two of the anti-friction bearings thus constructed are used on the outer ends of the axles, which project through the hubs of the wheels, and support the boxes placed within the pedestals. A cap covers one end of the box, placed on the end of the axle, through which there is a hole to receive a point projecting from the end of the axle, while a cap on the side of the pedestal will hold the anti-friction bearing in place. I attach one of the wheels rigidly to the axle in the usual manner; the other turns freely around the axle. The hub must be bored large enough to permit an anti-friction bearing to be slipped over the axle, and form a bearing for the wheel.

By making the wheels thus, one tight and one loose, the cars may be run around curves of short radius, without any undue strain upon the axle, as the loose wheel may turn either faster or slower, as it may happen to be on the outer and longer or inner and shorter track. By using the hereinbefore-described bearings I reduce the friction to the practical minimum.

I am aware that anti-friction bearings have been used for railway-axle journals, and that they have been used with a loose wheel. I do not, therefore, claim the use of either separately, but what I do claim as my invention, and desire to secure by Letters Patent, is—

In combination with the pedestals and axle of a railroad-car, two anti-friction bearings, constructed substantially as set forth, and also a tight and a loose wheel, the latter turning upon a similar bearing, substantially as and for the purpose set forth.

CHARLES H. PARSHALL.

Witnesses:
HOYT POST,
GEO. S. SWIFT.